United States Patent
Hassan et al.

(10) Patent No.: US 10,657,668 B2
(45) Date of Patent: May 19, 2020

(54) SYSTEMS AND METHODS FOR DETECTING AND TRACKING A MARKER

(71) Applicant: Tata Consultancy Services Limited, Mumbai (IN)

(72) Inventors: Ehtesham Hassan, Gurgaon (IN); Gaurav Gupta, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 99 days.

(21) Appl. No.: 15/465,471

(22) Filed: Mar. 21, 2017

(65) Prior Publication Data

US 2017/0278266 A1    Sep. 28, 2017

(30) Foreign Application Priority Data

Mar. 22, 2016    (IN) .............................. 201621010035

(51) Int. Cl.
*G06K 9/00* (2006.01)
*G06T 7/70* (2017.01)
(Continued)

(52) U.S. Cl.
CPC ................ *G06T 7/70* (2017.01); *G06F 3/012* (2013.01); *G06K 9/00234* (2013.01);
(Continued)

(58) Field of Classification Search
USPC ........................................................ 382/103
See application file for complete search history.

(56) References Cited

U.S. PATENT DOCUMENTS

| 5,751,429 A | * | 5/1998 | Wada | .......................... G01J 3/02 |
| | | | | 348/266 |
| 6,724,915 B1 | * | 4/2004 | Toklu | ....................... G06T 7/248 |
| | | | | 382/103 |

(Continued)

FOREIGN PATENT DOCUMENTS

WO    WO 2014/172671 A1    10/2014

OTHER PUBLICATIONS

Edebol et al., "In search for objective measures of hyperactivity, impulsivity and inattention in adult attention deficit hyperactivity disorder using the Quantified Behavior Test Plus", Europe's Journal of Psychology, vol. 7, issue 3, pp. 443-457, (2011) http://ejop.psychopen.eu/article/viewFile/143/pdf.

(Continued)

*Primary Examiner* — Stephen P Coleman
(74) *Attorney, Agent, or Firm* — Finnegan, Henderson, Farabow, Garrett & Dunner LLP

(57) ABSTRACT

Systems and methods for detecting and tracking a marker in real time is disclosed. Shape based segmentation of at least one object detected in a first frame from a sequence of frames is performed to define a region of interest (ROI) surrounding an object of interest corresponding to the marker. A marker detection model is dynamically trained based on sampling points from a plurality of pixels in and around the ROI. The marker is then tracked in real-time based on projected ROI in subsequent frames and the trained marker detection model. To optimize computation time required in classifying the pixels as marker pixels or non-marker pixels, the ROI is reduced to half its size, classification is performed on the reduced ROI and to improve accuracy, blob detection and classifying pixels along the boundary of the reduced ROI is performed by processing the ROI in original resolution.

13 Claims, 7 Drawing Sheets

(51) Int. Cl.
*G06T 7/11* (2017.01)
*G06T 7/246* (2017.01)
*G06T 7/12* (2017.01)
*G06K 9/32* (2006.01)
*G06T 7/90* (2017.01)
*G06F 3/01* (2006.01)
*G06K 9/46* (2006.01)
*G06K 9/62* (2006.01)
*G06K 9/66* (2006.01)
*G06T 3/40* (2006.01)
*G06T 5/20* (2006.01)

(52) U.S. Cl.
CPC ......... *G06K 9/3216* (2013.01); *G06K 9/4604* (2013.01); *G06K 9/6267* (2013.01); *G06K 9/66* (2013.01); *G06T 3/40* (2013.01); *G06T 5/20* (2013.01); *G06T 7/11* (2017.01); *G06T 7/12* (2017.01); *G06T 7/248* (2017.01); *G06T 7/90* (2017.01); *G06K 2009/3225* (2013.01); *G06K 2009/3291* (2013.01); *G06T 2207/10024* (2013.01); *G06T 2207/20061* (2013.01); *G06T 2207/20081* (2013.01); *G06T 2207/30204* (2013.01)

(56) References Cited

U.S. PATENT DOCUMENTS

| 2004/0193413 | A1* | 9/2004 | Wilson | G06F 3/017 704/243 |
| 2007/0195993 | A1* | 8/2007 | Chen | H04N 19/60 382/103 |
| 2009/0220138 | A1* | 9/2009 | Zhang | G06T 7/12 382/132 |
| 2010/0208205 | A1 | 8/2010 | Tseng et al. | |
| 2012/0314915 | A1* | 12/2012 | Ochi | G06K 9/00677 382/118 |
| 2013/0259304 | A1* | 10/2013 | Aller | G06K 9/3216 382/103 |
| 2017/0200268 | A1* | 7/2017 | Podilchuk | G06K 9/6232 |

OTHER PUBLICATIONS

Da Silva et al., "Gaze tracking, attention and interactive applications", HAL, 3 pages and pp. 1-24, (2007) https://hal.archives-ouvertes.fr/hal-00215973/document.

* cited by examiner

SYSTEMS AND METHODS FOR DETECTING AND TRACKING A MARKER

PRIORITY CLAIM

This U.S. patent application claims priority under 35 U.S.C. § 119 to: Indian Application No. 201621010035 filed on Mar. 22, 2016. The entire contents of the aforementioned application are incorporated herein by reference.

TECHNICAL FIELD

The embodiments herein generally relate to image analyses and more particularly to tracking a marker in real-time through image analyses.

BACKGROUND

Video games, movies and health care are some of the industries that rely on motion capture for enhanced experience and accurate prediction of movement of objects. Recent growth in camera technologies, and advancement in related research have proved vision as a primary sensor model for various applications which require human behavior characterization. In the past few decades, there has been an exponential growth in applications related to market research, health care, surveillance, and the like. An automatic approach for analyzing visual data for human behavior analysis offers two primary advantages. Firstly, subtle behavior details can be captured which otherwise may remain unnoticed. Secondly, an entire video can be summarized in much less time detecting all events in the duration under consideration. Hence it is imperative that movement is tracked precisely and in real time.

SUMMARY

Embodiments of the present disclosure present technological improvements as solutions to one or more of the above-mentioned technical problems recognized by the inventors in conventional systems.

In a preferred embodiment, systems and methods of the present disclosure facilitate real time color marker based head tracking for human behavior analysis. In the preferred embodiment, the marker is mounted on the head of a subject using a wearable device which can be monitored via a monocular camera placed suitably. Particularly, when tracking is to be applied in the healthcare industry for behavior analysis high accuracy and precision requirement is a challenge that systems and methods of the present disclosure address when dealing with random movement patterns. A small error in detection can seriously affect the outcome of behavior characterization. Systems and methods of the present disclosure analyze incoming stream of video in real time by optimizing processing time required when processing a huge volume of video.

In an aspect, there is provided a method for detecting and tracking a marker, the method comprising: performing shape based segmentation of at least one object detected in a first frame from a sequence of frames, the at least one object having a shape in line with the shape of the marker to define a region of interest (ROI) surrounding an object of interest corresponding to the marker, the ROI comprising a plurality of pixels; and iteratively performing until a last frame from the sequence of frames is received: dynamically training and updating a marker detection model based on sampling points from the plurality of pixels in and around the ROI; and tracking the marker in real-time based on projected ROI in subsequent frames of the sequence of frames and the marker detection model.

In an embodiment of the present disclosure, the performing shape based segmentation comprises: receiving the first frame containing the at least one object; performing shape based feature extraction on the first frame to detect the at least one object; eliminating false objects from the at least one object to identify the object of interest; and defining the region of interest (ROI) surrounding the object of interest.

In an embodiment of the present disclosure, dynamically training and updating a marker detection model comprises: classifying the plurality of pixels in the ROI as marker pixels and pixels around the ROI as non-marker pixels; and training and updating the marker detection model being a support vector machine (SVM), using the marker pixels, the non-marker pixels and velocity of the marker corresponding to one or more frames under consideration in relation to a previous frame in the sequence of frames.

In an embodiment of the present disclosure, tracking the marker in real-time comprises: projecting the ROI in the subsequent frames based on location of the ROI in the first frame and one or more temporal parameters associated with the shape of the object of interest; and classifying the pixels in the projected ROI in the subsequent frames as marker pixels and non-marker pixels based on the marker detection model to predict location of the marker in the subsequent frames.

In an embodiment of the present disclosure, performing shape based segmentation comprises applying Hough transform technique.

In an embodiment of the present disclosure, the marker is associated with a color, preferably green.

In an embodiment of the present disclosure, eliminating false objects comprises use of a color density based band-pass filter In an embodiment of the present disclosure, the shape of the marker and the object of interest is circular.

In an embodiment of the present disclosure, the ROI is square shaped and surrounds the circular object of interest.

In an embodiment of the present disclosure, an edge of the square shaped ROI is 1.4142 times diameter of the circular object of interest.

In an embodiment of the present disclosure, the one or more temporal parameters are position of the ROI, velocity of the marker, radius and centroid of the circular object of interest.

In an embodiment of the present disclosure, classifying the plurality of pixels as marker pixels and pixels around the ROI as non-marker pixels is based on a color intensity histogram.

In an embodiment of the present disclosure, the velocity of the marker is computed based on a centroid of the marker detected in the one or more frames under consideration in relation to a previous frame in the sequence of frames.

In an embodiment of the present disclosure, classifying the pixels in the projected ROI comprises: resizing the projected ROI to half its original size to generate a reduced ROI having reduced resolution; performing classification of the pixels in the reduced ROI as marker pixels and non-marker pixels; and performing blob detection and classifying pixels along boundary of the reduced ROI by processing the ROI in original resolution In an embodiment of the present disclosure, performing blob detection comprises: generating a binary equivalent image of the reduced ROI, the binary equivalent image being characterized by labels based on classification of the pixels in the reduced ROI; resizing the binary equivalent image with a circular blob in the reduced ROI to original resolution; and refining pixels at boundary of the circular blob in the binary equivalent image by relating it with pixel locations in the ROI with original resolution.

In another aspect, there is provided a system comprising: one or more processors; and one or more internal data storage devices operatively coupled to the one or more processors for storing instructions configured for execution by the one or more processors, the instructions being comprised in: an image segmenter configured to: perform shape based segmentation of at least one object detected in a first frame from a sequence of frames, the at least one object having a shape in line with the shape of the marker to define a region of interest (ROI) surrounding an object of interest corresponding to the marker, the ROI comprising a plurality of pixels; a marker detection model trainer configured to: dynamically train and update a marker detection model based on sampling points from the plurality of pixels in and around the ROI; and a marker tracker configured to: tracking the marker in real-time based on projected ROI in subsequent frames of the sequence of frames and the marker detection model.

In an embodiment, the image segmenter is further configured to: receive the first frame containing the at least one object; perform shape based feature extraction on the first frame to detect the at least one object; eliminate false objects from the at least one object to identify the object of interest; and define the region of interest (ROI) surrounding the object of interest.

In an embodiment, the marker detection model trainer is further configured to: classify the plurality of pixels in the ROI as marker pixels and pixels around the ROI as non-marker pixels; and train and update the marker detection model being a support vector machine (SVM), using the marker pixels, the non-marker pixels and velocity of the marker corresponding to one or more frames under consideration in relation to a previous frame in the sequence of frames.

In an embodiment, the marker tracker is further configured to: projecting the ROI in the subsequent frames based on location of the ROI in the first frame and one or more temporal parameters associated with the shape of the object of interest; and classifying the pixels in the projected ROI in the subsequent frames as marker pixels and non-marker pixels based on the marker detection model to predict location of the marker in the subsequent frames.

In yet another aspect, there is provided a computer program product comprising a non-transitory computer readable medium having a computer readable program embodied therein, wherein the computer readable program, when executed on a computing device, causes the computing device to: perform shape based segmentation of at least one object detected in a first frame from a sequence of frames, the at least one object having a shape in line with the shape of the marker to define a region of interest (ROI) surrounding an object of interest corresponding to the marker, the ROI comprising a plurality of pixels; and iteratively perform until a last frame from the sequence of frames is received: dynamically training and updating a marker detection model based on sampling points from the plurality of pixels in and around the ROI; and tracking the marker in real-time based on projected ROI in subsequent frames of the sequence of frames and the marker detection model.

BRIEF DESCRIPTION OF THE DRAWINGS

The embodiments herein will be better understood from the following detailed description with reference to the drawings, in which.

Figure 1:
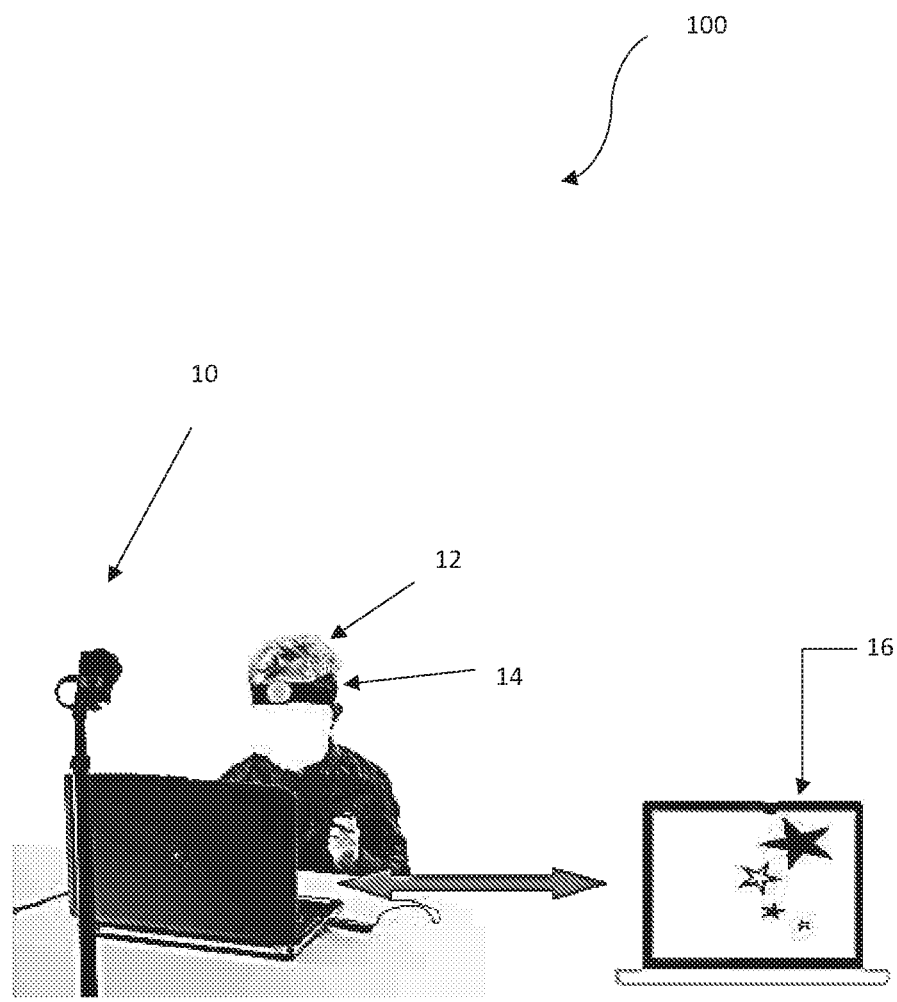
FIG. 1 illustrates an exemplary setup for operation of systems and methods of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

With advancement in vision technologies, health-care industry is looking for non-intrusive methods for early-diagnosis of Neuro-development disorders such as Autism Spectrum Disorder (ASD) and Attention Deficit Hyperactivity Disorder (ADHD). Such disorders cause specific activity patterns such as inappropriate attention, hyperactivity, and impulsiveness. Different disorders have great variation in terms of activities as shown by studies in neuroscience and psychology. There is growing evidence that head motion reflects valuable information regarding an individual's psychological and/or clinical factors. Head motion helps researchers in understanding mental disorders especially ADHD and Autism related issues. The present disclosure is directed towards gauging inappropriate attention problem of a subject under observation using visual data.

Referring now to the drawings, and more particularly to FIGS. 1 through 4, where similar reference characters denote corresponding features consistently throughout the figures, there are shown preferred embodiments and these embodiments are described in the context of the following exemplary system and method.

FIG. 1 illustrates an exemplary setup 100 for implementing systems and methods of the present disclosure. In an embodiment, the setup 100 consists of a single monocular camera 10 for receiving visual input in the form a video stream which focuses on head movements of a subject 12 taking a diagnostic test for a pre-defined duration of a session. Head movements of the subject 12 exhibit key characteristics which over the duration of the session can define particular behavioral traits. The head movements are captured by tracking a marker 14 worn at the forehead by the subject 12. In an embodiment, the marker 14 is an active circular color marker made of green LED. In an embodiment, a stimuli 16 is played on a computer screen (not particularly referenced) and the camera 10 captures the face of the subject 12 exhibiting various responses while performing actions in response to the stimuli 16 on the screen, particularly image of the marker 14 worn on the subject's forehead is tracked. Tracking of the marker 14 poses two primary challenges. Firstly, the precision and accuracy of detected track is critical since application of the output of the systems of the present disclosure may include behavior analysis where a small error may be detrimental to the subject. The camera 10 and the computer screen are a fixed setup, whereas illumination (marker) is an independent parameter. Further, randomness in motion would make the marker 14 disappear/re-appear frequently on the computer screen. It is critical to record centroid of the marker 14 with high precision and accuracy. Secondly, processing of an image of the marker 14 needs to be time efficient addressing both offline and online detection without compromising the accuracy. To address this problem, the present disclosure provides a monocular tracking scheme for frame-wise detection of non-textured active color marker observed from an on/off axis angle. The marker 14 is green colored (can be easily filtered as non-skin) and circular (easy shape to detect with few parameters), and wearable on the forehead of the subject 12 for tracking. Systems and methods of the present disclosure detect target (image of the marker 14) with high precision and accuracy from a first frame of the input video stream. Target detecting is localized by utilizing motion information pertaining to the target in subsequent frames, thereby improving timing performance.

Figure 2:
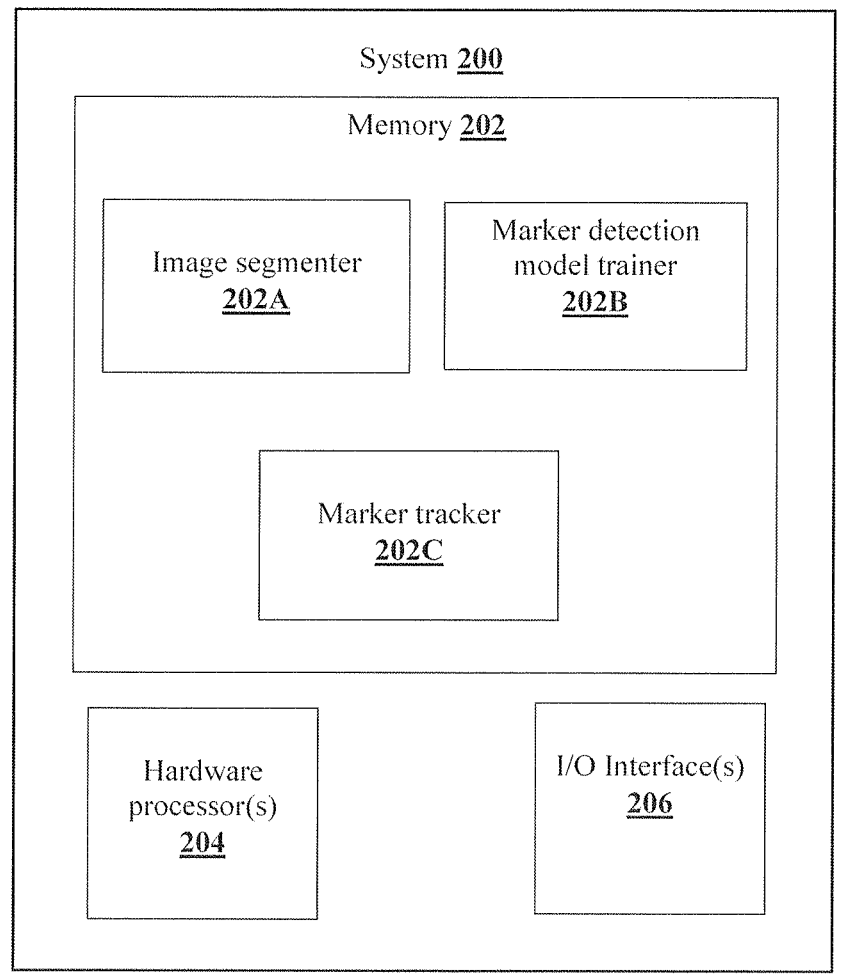
FIG. 2 illustrates an exemplary block diagram of a system for detecting and tracking a marker in accordance with an embodiment of the present disclosure.

FIG. 2 is an exemplary block diagram of a system 200 for detecting and tracking a marker, illustrating exemplary functional modules in accordance with an embodiment of the present disclosure. In an embodiment, the system 200 includes one or more processors 204, communication interface device(s) or input/output (I/O) interface(s) 206, and one or more data storage devices or memory 202 operatively coupled to the one or more processors 204. The one or more processors 204 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 200 can be implemented in a variety of computing systems, such as a laptop computer, a desktop computer, a notebook, a workstation, a mainframe computer, a server, a network server, cloud, hand-held device and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules 202A through 202C of the system 200 can be stored in the memory 202.

Figure 3A:
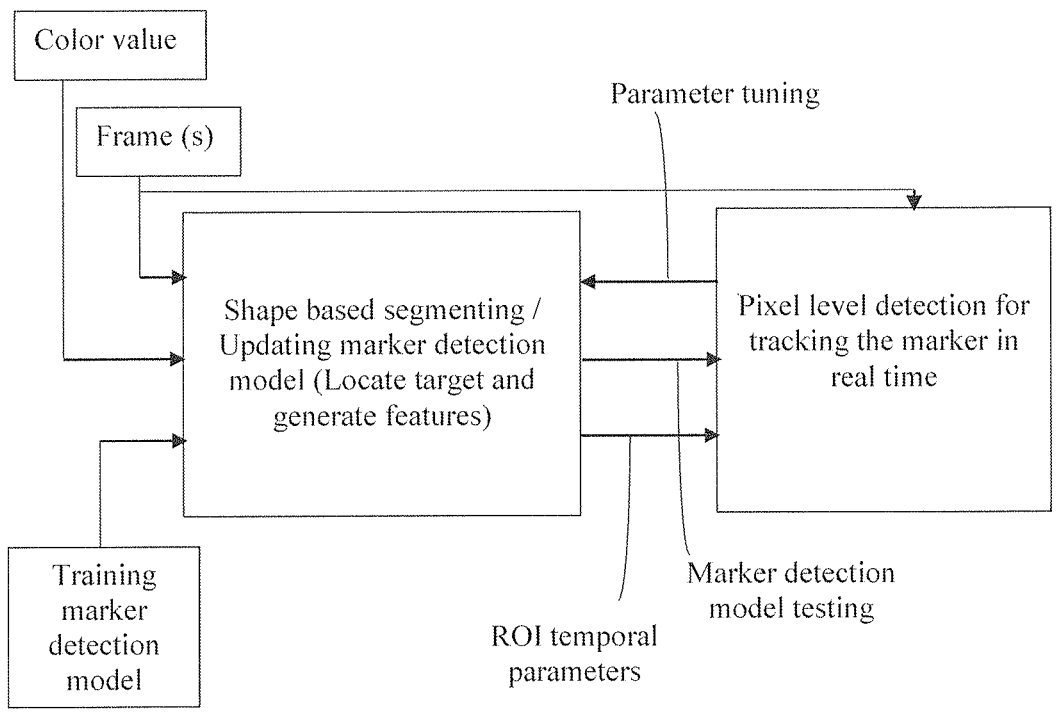
FIG. 3A through FIG. 3C are exemplary flow charts illustrating key steps executed by the system in accordance with an embodiment of the present disclosure.
Figure 3B:
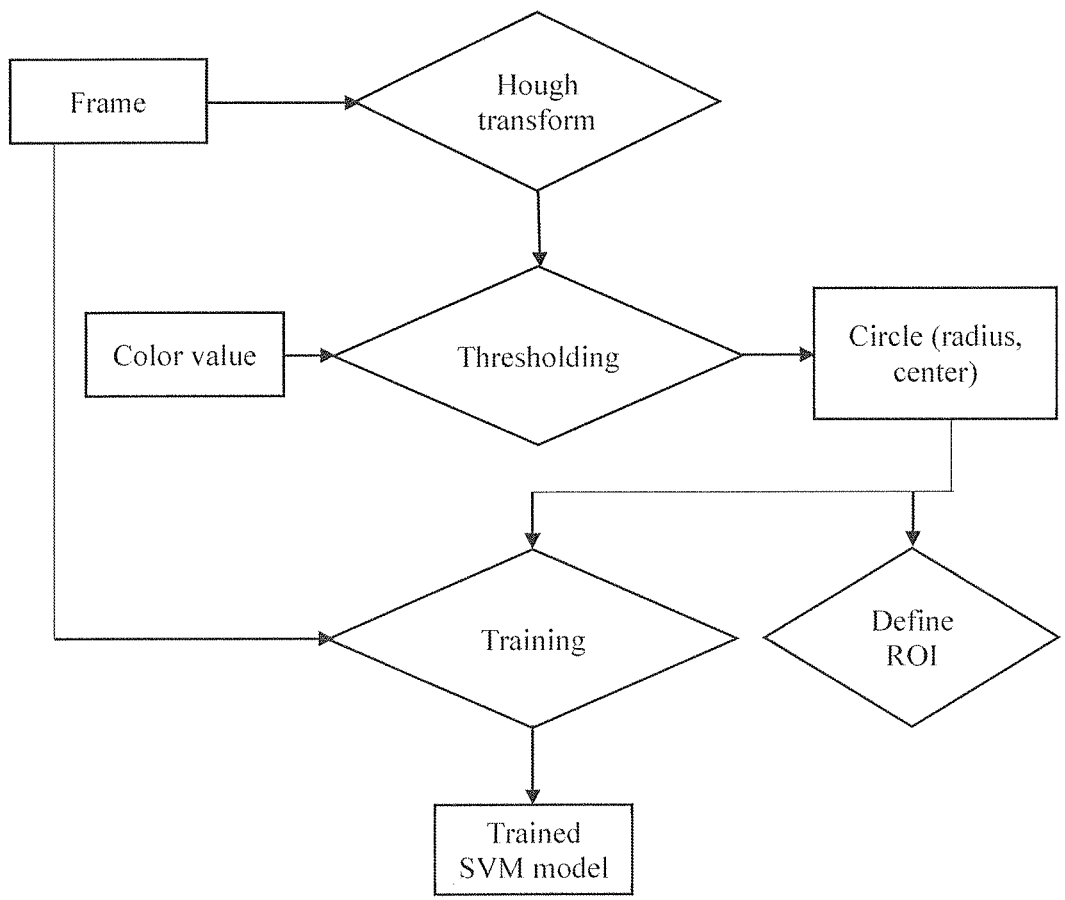
Figure 3C:
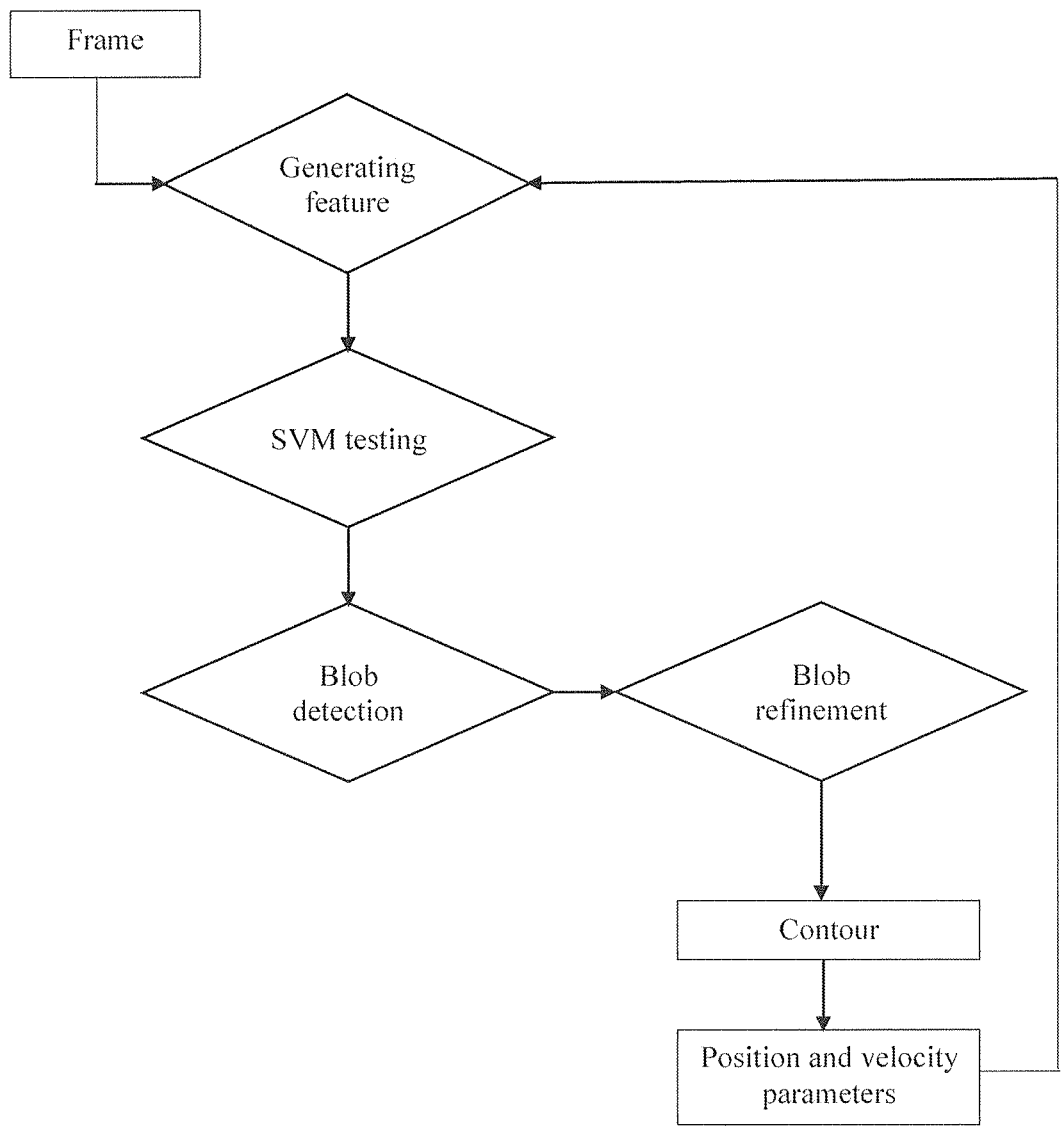

The steps of the method illustrated in FIG. 4A through FIG. 4D of the present disclosure will now be explained in detail with reference to the components of the system 200 as depicted in FIG. 2 and with reference to the exemplary flow charts of FIG. 3A through FIG. 3C illustrating key steps executed by the system in accordance with one embodiment of the present disclosure.

FIG. 3A illustrates operational flow at a broad level between the modules image segmenter 202A, marker detection model trainer 202B and marker tracker 202C of the system 200 as illustrated in FIG. 2. In an embodiment, at step 402 of FIG. 4A, the image segmenter 202A is configured to perform shape based segmentation of at least one object detected in a first frame from a sequence of frames, wherein the at least one object has a shape in line with the shape of the marker to define a region of interest (ROI) surrounding an object of interest corresponding to the marker. The ROI defined by the image segmenter 202A comprises a plurality of pixels. In an embodiment, the step of performing shape based segmentation comprises applying Hough transform technique. In an embodiment, the marker is associated with a color. In a preferred embodiment, the marker emits green colored light since green colored pixels can be easily classified as non-skin pixels. Thus color value and at least one frame are provided as an input to the image segmenter 202A wherein the first frame is processed to define the ROI.

Figure 4A:
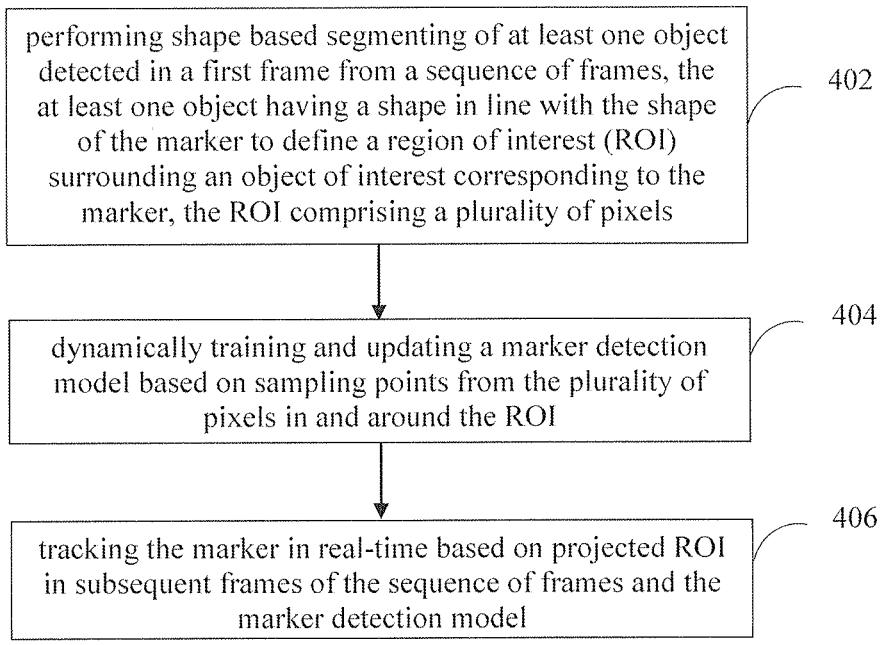
FIG. 4A through FIG. 4D are exemplary flow diagrams illustrating a method for detecting and tracking a marker in accordance with an embodiment of the present disclosure.
Figure 4B:
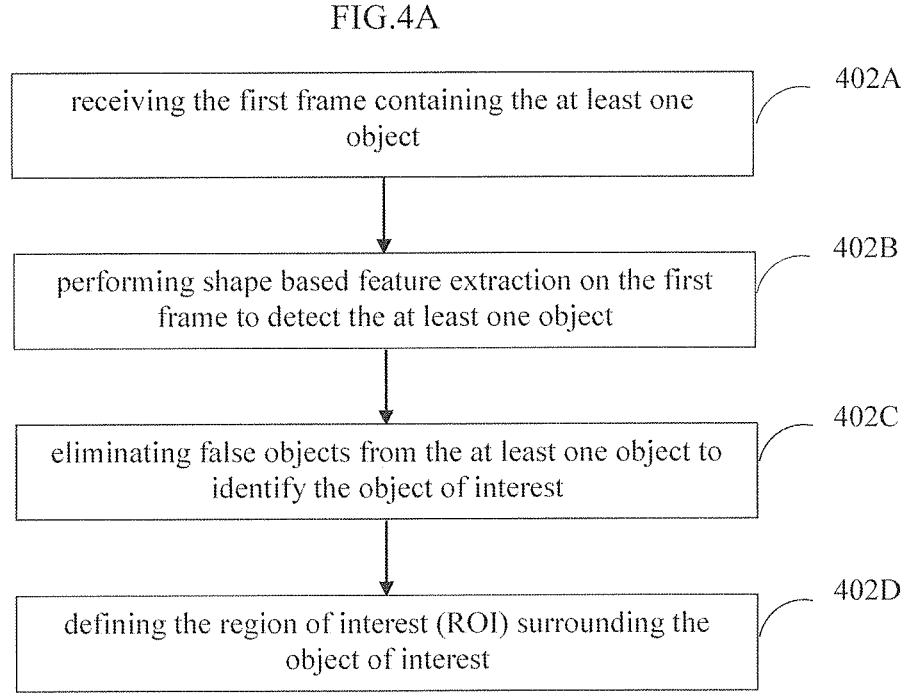

In an embodiment, as illustrated in FIG. 4B, the step 402 comprises steps 402A through 402D implemented by the image segmenter 202A, wherein firstly the first frame containing the at least one object is received and shape based feature extraction is performed on the first frame to detect at least one object. False objects are eliminated to identify the object of interest that corresponds to the marker and the ROI is defined surrounding the object of interest. In an embodiment, the shape of the marker and the object of interest is circular. In an embodiment eliminating false objects includes use of a color density based band-pass filter to eliminate all but green color that is the color of the marker in the exemplary embodiment.

Referring to FIG. 3B, in an embodiment, the shape based segmentation of circular objects from the first frame is performed by Hough transform technique. In the exemplary embodiment, the marker is circular in shape and accordingly, all objects that are circular in shape are captured. Edge detection threshold in Hough transform based circle detection is relaxed to ensure that at least n circular shaped objects are captured or no further relaxation is possible, thereby resulting in some false detections. In an exemplary embodiment, n=3.

False detections are then eliminated by a color density based band-pass filter which is defined as follows.

For each circle $c_j$, j=1, 2, . . . , n $$N_{cj} = \sum_{p_i \in c_j} (u^R > p_i^R > l^R) \cap (u^G > p_i^G > l^G) \cap (u^B > p_i^B > l^B) \rightarrow (1)$$

wherein $p_i$ is the $i^{th}$ pixel inside circle $c_j$ and $p_i^R$, $p_i^G$, $p_i^B$ are the corresponding intensity values in R, G, and B channel. l and u are the lower and upper thresholds for marker color which is fixed using prior knowledge. Inequality operations return Boolean true or false, and ∩ represents the AND operation between them. The summation over all pixels in $c_j$ gives the pixel count satisfying the band-pass condition. Using the count, a confidence measure for $c_j$ is generated by normalizing the count with area of the circle as described in equation (2) herein below.

$$Conf(C_j) = \frac{N_{cj}}{A_{cj}} \rightarrow (2)$$

wherein $A_{cj}$ denotes the total area of circle. A circle having maximum confidence measure among the detected objects is selected as the circular object of interest.

Figure 4C:
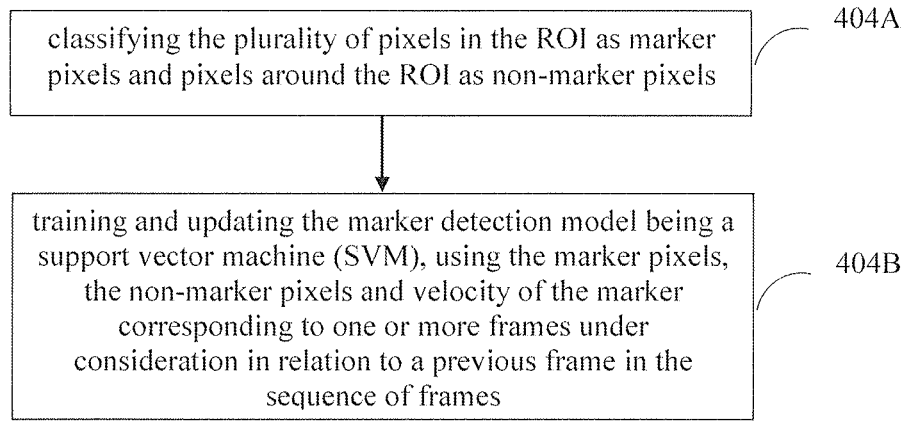

At step 404, the marker detection model trainer 202B is configured to dynamically train and update a marker detection model based on sampling points from the plurality of pixels in and around the ROI. As shown in FIG. 4C, the step 404 further comprises step 404A wherein the plurality of pixels in the ROI are classified as marker pixels (positive samples) and pixels around the ROI are classified as non-marker pixels (negative samples) and step 404B wherein the marker detection model being a support vector machine (SVM) is trained and updated using the marker pixels, the non-marker pixels and velocity of the marker corresponding to one or more frames under consideration in relation to a previous frame in the sequence of frames. In an embodiment, the steps 404A and 404B are implemented by the marker detection model trainer 202B. Thus two classes of pixels are classified, positive training samples including the marker pixels from inside the ROI and negative training samples including the non-marker pixels collected uniformly from around the boundary of the ROI. In an exemplary embodiment, a training set consisting of 500 positive and 500 negative samples maintain a balanced proportion. If the actual collected samples are in shortage, more samples may be repopulated by replication and if the actual collected samples are in excess then the samples may be limited to 1000 by deleting extra samples.

As the marker is uniform in color, color intensity histogram feature may be used to represent pixels in the ROI. A neighborhood of 5×5 pixels for color histogram computation is considered which uses 8 uniformly spaced bins for quantization. In turn, each pixel is represented as a 24 dimensional vector obtained by linear concatenation of color histogram for individual channels. Further, in an embodiment, histogram in CIE (Commission Internationale de l'Eclairage) Lab color space may be employed primarily because of its perceptual uniformity and closeness to human vision. The training samples collected are thus applied to learn SVM based binary classifier where a linear kernel is applied. The parameters of the classifier are selected after cross validating cost value. The SVM training model is checked for an update at predetermined intervals. Each check is further followed by another check on a threshold to the velocity of the marker in previous frame. In an exemplary embodiment, if the velocity is less than 10 pixels/frame then the marker is called stable and model is updated.

Figure 4D:
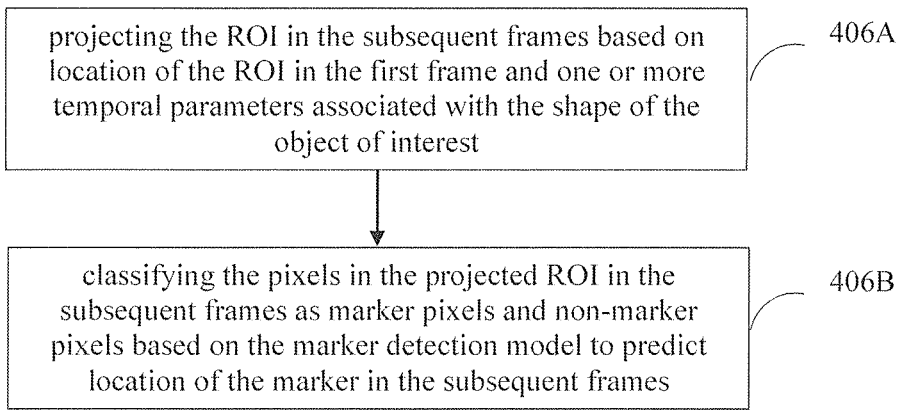

In an embodiment, after step 404, pixels corresponding to the detected ROI are classified as marker pixels and non-marker pixels based on color attributes characterized by color histogram and a trained SVM model is generated. At step 406, the marker tracker 202C is configured to track the marker in real-time based on projected ROI in subsequent frames of the sequence of frames and the trained and updated marker detection model. As shown in FIG. 4D, the step 406 further comprises step 406A, wherein the ROI is projected in the subsequent frames based on location of the ROI in the first frame and one or more temporal parameters associated with the shape of the object of interest and step 406B, wherein the pixels in the projected ROI are classified in the subsequent frames as marker pixels and non-marker pixels based on the marker detection model to predict location of the marker in the subsequent frames. In an embodiment, steps 406A and 406B are implemented by the marker tracker 202C. In an embodiment, classifying the plurality of pixels as marker pixels and pixels around the ROI as non-marker pixels is based on a color intensity histogram.

In an embodiment, the velocity of the marker is computed based on a centroid of the marker detected in the one or more frames under consideration in relation to a previous frame in the sequence of frames. At each frame, centroid of the marker is obtained and the velocity of the marker is calculated based on equation (3) herein below.

$$V_t = Centroid_t - Centroid_{t-1} \rightarrow (3)$$

In an embodiment, the one or more temporal parameters are position of the ROI, velocity of the marker, radius and centroid of the circular object of interest. The ROI size in a current frame depends on the size of detected object in a previous frame and its position is found by adding the ROI position in the previous frame and marker velocity. Also, the ROI around the marker circle is fixed with sufficient margin to accommodate a possible shift in marker position due to unpredictable variations in motion. Thus centroid of the circular object of interest is predicted as shown in equation (4) herein below.

$$Centroid_{t+1} = Centroid_t + V_t \rightarrow (4)$$

$$a = \sqrt{2} \times (2r) \rightarrow (5)$$

$Centroid_{t+1}$ is the projected centroid of the ROI and a is edge length of the ROI. In an embodiment, the ROI is square shaped and surrounds the circular object of interest. In an embodiment, an edge of the square shaped ROI is $\sqrt{2}$ times diameter of the circular object of interest as shown in equation (5). In the square ROI of the frame, each pixel is applied to a learned SVM model. If the ROI has a pixels in each dimension, $a^2$ classification computations would have to be performed. In an exemplary setup, let the image under consideration be a high resolution image having 1280*720 pixels. In this resolution setting, $a^2$ would be a sufficiently high number of computation to be performed in real time. Therefore, for fast processing of the ROI, the present disclosure provides an alternative approach. In an embodiment, the projected ROI or $ROI_{org}$ is resized to half its original size to generate a reduced ROI or $ROI_{half}$ having reduced resolution. Classification of the pixels is now to be performed on the reduced ROI or $ROI_{half}$ thereby reducing the required number of classification computations to $\frac{1}{4}^{th}$ of $a^2$.

However, high accuracy needs classification to be performed at original resolution. To address this issue, the method of the present disclosure provides performing blob detection and classifying pixels along boundary of the reduced ROI or $ROI_{half}$ by processing the ROI in original resolution. The $ROI_{half}$ has $a^2/4$ pixels, which are applied to the learned SVM module obtained at step 404. In an embodiment, a binary equivalent image of the reduced ROI or $ROI_{half}$ is generated, wherein the binary equivalent image is characterized by labels based on classification of the pixels in the reduced ROI or $ROI_{half}$. The binary equivalent image with a circular blob in the reduced ROI or $ROI_{half}$ is re-sized to original resolution to generate $ROI_{org}^{bin}$. The boundary pixels on the marker are pixels that need to be classified accurately and hence need to be processed at original resolution. The tracking object in the present application i.e. marker is circular in shape, and hence edge points are more significant than points inside the blob. With this understanding, the pixel detections $ROI_{org}^{bin}$ at the boundary of the blob are refined by correlating it with the pixel locations in the $ROI_{org}$. A circular band of 5 pixels on the boundary of the blob in the $ROI_{org}^{bin}$ is identified with the objective of covering maximum uncertain points. These points are reprocessed for SVM classification using histogram feature based representation. The output labels of classification are overwritten to the labels in the $ROI_{org}^{bin}$. Blob refinement performed in this manner may achieve the same overall marker detection accuracy as computed on original resolution while the overall classification computations are significantly less than $a^2$. If the blob in the $ROI_{org}$ is a perfect circle, and if $a=4r$, $r$ being the radius, it is observed that $$a^2 > \frac{a^2}{4} + 5(2\Pi r) \quad \rightarrow (6)$$

$$r > 2.616 \quad \rightarrow (7)$$

Therefore, in accordance with the present disclosure, the marker radius needs to be greater than 3 pixels. In an exemplary setup, the marker radius in the original resolution varies from 25 to 30 pixels. The parameters of the detected blob i.e. center and radius are used as reference for computing the ROI in the next frame. The center is computed as the mean of all blob's pixel locations, whereas radius is calculated as mean distance of boundary pixels from the center.

In an embodiment, the step 404 of dynamically training and updating a marker detection model further comprises training and updating based on predicted location of the marker in the subsequent frames.

In an exemplary setup, the system and method of the present disclosure was evaluated on recorded videos with an LED based active marker mounted on a robotic assembly, as well as generated by a handheld device. The robotic assembly generated circular, square and stationary motion in the marker. Using these simple trajectories, the detected trajectory was validated using ground truth obtained from the setup. The exemplary videos had four separate runs of duration varying from 1 min to 5 min and green LED based marker was used. The videos were captured under different ambient lighting conditions with different backgrounds. The system of the present disclosure showed satisfactory accuracy where the average detected marker center deviation from ground truth was within permissible limit of 1 pixel. The sub-optimal implementation when simulated on different environments including Ubuntu, Mac and iPad-Air has shown real-time performance with 30 FPS (frames per second).

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A method for detecting and tracking a marker, the method comprising:
    performing shape based segmentation of at least one object detected in a first frame from a sequence of frames, the at least one object having a shape in line with shape of the marker to define a region of interest (ROI) surrounding an object of interest corresponding to the marker, the ROI comprising a plurality of pixels, wherein performing shape based segmentation comprises:
    receiving the first frame containing the at least one object;
    performing shape based feature extraction on the first frame to detect the at least one object;
    eliminating false objects from the at least one object to identify the object of interest, wherein eliminating the false objects comprises use of a color density based band-pass filter and
    defining the region of interest (ROI) surrounding the object of interest; and
    iteratively performing until a last frame from the sequence of frames is received:
        dynamically training and updating a marker detection model based on sampling points from the plurality of pixels in and around the ROI, wherein dynamically training and updating a marker detection model comprises;
        classifying the plurality of pixels in the ROI as marker pixels and pixels around the ROI as non-marker pixels;
    training and updating the marker detection model being a support vector machine (SVM), using the marker pixels, the non-marker pixels and velocity of the marker corresponding to one or more frames under consideration in relation to a previous frame in the sequence of frames; and
        tracking the marker in real-time based on projected ROI in subsequent frames of the sequence of frames and the marker detection model.

2. The method of claim 1, wherein performing shape based segmentation comprises applying Hough transform technique.

3. The method of claim 1, wherein the shape of the marker and the object of interest is circular.

4. The method of claim 1, wherein classifying the plurality of pixels as marker pixels and pixels around the ROI as non-marker pixels is based on a color intensity histogram.

5. The method of claim 1, wherein the velocity of the marker is computed based on a centroid of the marker detected in the one or more frames under consideration in relation to a previous frame in the sequence of frames.

6. The method of claim 1, wherein tracking the marker in real-time comprises:
    projecting the ROI in the subsequent frames based on location of the ROI in the first frame and one or more temporal parameters associated with the shape of the object of interest; and
    classifying the pixels in the projected ROI in the subsequent frames as marker pixels and non-marker pixels based on the marker detection model to predict location of the marker in the subsequent frames.

7. The method of claim 6, wherein the one or more temporal parameters are position of the ROI, the velocity of the marker, radius and centroid of the circular object of interest.

8. The method of claim 1, wherein the ROI is square shaped and surrounds the circular object of interest.

9. The method of claim 8, wherein an edge of the square shaped ROI is 1.4142 times diameter of the circular object of interest.

10. The method of claim 1, wherein classifying the pixels in the projected ROI comprises:
    resizing the projected ROI to half its original size to generate a reduced ROI having reduced resolution;
    performing classification of the pixels in the reduced ROI as marker pixels and non-marker pixels; and
    performing blob detection and classifying the pixels along boundary of the reduced ROI by processing the ROI in original resolution.

11. The method of claim 10, wherein performing blob detection comprises:
    generating a binary equivalent image of the reduced ROI, the binary equivalent image being characterized by labels based on classification of the pixels in the reduced ROI;
    resizing the binary equivalent image with a circular blob in the reduced ROI to original resolution; and
    refining pixels at boundary of the circular blob in the binary equivalent image by relating it with pixel locations in the ROI with original resolution.

12. A system comprising:
    one or more processors; and
    one or more internal data storage devices operatively coupled to the one or more processors for storing instructions configured for execution by the one or more processors, the instructions being comprised in:
    an image segmenter configured to:
    perform shape based segmentation of at least one object detected in a first frame from a sequence of frames, the at least one object having a shape in line with shape of the marker to define a region of interest (ROI) surrounding an object of interest corresponding to the marker, the ROI comprising a plurality of pixels, wherein the image segmenter is further configured to:
    receive the first frame containing the at least one object;
    perform shape based feature extraction on the first frame to detect the at least one object;
    eliminate false objects from the at least one object to identify the object of interest, wherein
    eliminating the false objects comprises use of a color density based band-pass filter; and define the region of interest (ROI) surrounding the object of interest;
a marker detection model trainer configured to:
dynamically train and update a marker detection model based on sampling points from the plurality of pixels in and around the ROI;
classify the plurality of pixels in the ROI as marker pixels and pixels around the ROI as non-marker pixels; and
train and update the marker detection model being a support vector machine (SVM), using the marker pixels, the non-marker pixels and velocity of the marker corresponding to one or more frames under consideration in relation to a previous frame in the sequence of frames, and
a marker tracker configured to:
tracking the marker in real-time based on projected ROI in subsequent frames of the sequence of frames and the marker detection model.

13. The system of claim 12, wherein the marker tracker is further configured to:
projecting the ROI in the subsequent frames based on location of the ROI in the first frame and one or more temporal parameters associated with the shape of the object of interest; and
classifying the pixels in the projected ROI in the subsequent frames as marker pixels and non-marker pixels based on the marker detection model to predict location of the marker in the subsequent frames.

* * * * *